United States Patent [19]

McCloskey

[11] 4,079,490
[45] Mar. 21, 1978

[54] METHOD OF MANUFACTURING BEARINGS

[75] Inventor: Albert R. McCloskey, Fairfield, Conn.

[73] Assignee: The Heim Universal Corporation, Fairfield, Conn.

[21] Appl. No.: 594,175

[22] Filed: Jul. 8, 1975

[51] Int. Cl.² .................................................. B21D 53/10
[52] U.S. Cl. .................................. 29/149.5 B; 308/72; 308/DIG. 8; 29/149.5 NM
[58] Field of Search ............... 29/149.5 C, 149.5 B, 29/149.5 NM, 149.5 R; 308/DIG. 8, 237 R, 2 R, 2 A

[56] References Cited

U.S. PATENT DOCUMENTS

| 3,056,709 | 10/1962 | Rising et al. | 428/148 |
| 3,068,552 | 12/1962 | Williams et al. | 29/149.5 B |
| 3,365,249 | 1/1968 | McCloskey | 308/72 |
| 3,369,285 | 2/1968 | Heim | 29/149.5 B |
| 3,471,207 | 10/1969 | McCloskey | 308/72 |
| 3,528,714 | 9/1970 | McCloskey | 308/238 |
| 3,562,885 | 2/1971 | McCloskey | 29/149.5 B |
| 3,616,520 | 11/1971 | Bucalo | 29/149.5 B |
| 3,654,683 | 4/1972 | White | 29/149.5 B |

Primary Examiner—C.W. Lanham
Assistant Examiner—V. K. Rising
Attorney, Agent, or Firm—James C. Wray

[57] ABSTRACT

A method of manufacturing a bearing which advantageously includes a self-lubricating liner in which the bearing liner includes a woven fabric coated with a resin and powdered or flocked polytetrafluoroethylene particles on one side thereof, the liner and its resin cured in place within the bearing, a parting compound disposed on a bearing surface in contact with the liner having the self-lubricating particles disposed therein, the parting compound inhibiting bonding between the bounding surface and the liner during curing.

12 Claims, 2 Drawing Figures

METHOD OF MANUFACTURING BEARINGS

BACKGROUND OF THE INVENTION

The present invention relates to bearing liners and methods of constructing same which are particularly adapted to self-aligning bearings and bushings (all of which are hereinafter called "bearings") and to products produced thereby. This application comprises an improvement over my previous U.S. Pat. No. 3,471,207, patented Oct. 7, 1969, entitled "Bearing Liner Having Etched Particles Embedded Therein"; U.S. Pat. No. 3,528,714, patented Sept. 15, 1970, entitled "Bearing and Method of Bearing Construction"; U.S. Pat. No. 3,562,885, patented Feb. 16, 1971, entitled "Method of Making Bearing"; and U.S. patent application Ser. No. 563,569 filed Mar. 31, 1975 in the U.S. Patent Office, entitled "Bearing Assembly and Liner".

Traditionally, bearings have been lubricated by liquid lubricants such as oil. It has been necessary to design such bearings carefully so that they would retain oil for some time. Even with the best design, however, it has been necessary to periodically replenish the oil supply. If the oil was not replenished, either because the bearings were in out-of-the-way locations or because they were not properly maintained, the bearings became dry and wore rapidly.

Many efforts have been made to produce bearings using dry lubricants such as various types of plastic, graphite, or special chemicals. Generally speaking, these dry lubricants are soft and consequently are easily distorted under heavy loads. In particular, either the dry lubricant was squeezed out of the bearing or else the bearings became loose and wore rapidly. In addition, it is characteristically difficult to bond such dry lubricants to a desired bearing member. While certain of these efforts have resulted in the manufacturing of satisfactory bearing liners, the methods for manufacturing same have involved costly and complicated manufacturing techniques involving many forms of special purpose machinery and apparatus. This special purpose machinery and apparatus in most cases was required for the preparation of the self-lubricating materials for their ultimate introduction into an operational bearing. More specifically, the prior art approaches involved the initial step of preparing the bearing liner, curing same and, finally, assembling it within its associated bearing.

SUMMARY OF THE INVENTION

It is therefore an object of the present invention to provide a method of manufacturing a bearing comprising the steps of forming an outer bearing member and an inner bearing member, forming a bearing liner including uncured adhesive resin applied to each side of a liner material, coating a bearing surface of one of the bearing members with a parting compound, placing the uncured liner in a position between said outer and inner members, deforming one of said members to form an assembled bearing, applying heat to the assembled bearing, curing said resin material thereby bonding the liner to said bearing member to which the parting compound was not applied, the parting compound inhibiting a bond between the liner and said bearing member to which said parting compound was applied.

It is a further object of the present invention to provide a method of manufacturing a bearing wherein said outer bearing member is provided with a concave inner bearing surface and said inner bearing member is provided with a complementary convex outer surface, coating the parting compound to the convex outer surface of said inner bearing member.

It is still a further object of the present invention to provide a method of manufacturing a bearing wherein a random dispersion of self-lubricating particles is included within the resin applied to the side of said liner confronting the bearing member to which the parting compound was applied.

It is another object of the present invention to provide a method of manufacturing a bearing wherein said self-lubricating particles include a random dispersion of polytetrafluoroethylene particles.

It is yet another object of the present invention to provide a method of manufacturing a bearing wherein said self-lubricating particles include a random dispersion of flocked polytetrafluoroethylene fibers.

It is still another object of the present invention to provide a method of manufacturing a bearing wherein said liner includes a Nomex cloth.

It is a further object of the present invention to provide a method of manufacturing a bearing wherein said uncured resin applied to each side of said liner is air dried before placing said liner in a telescoped position between said outer and inner members.

It is also an object of the present invention to provide a method of manufacturing a bearing wherein heat is applied to the assembled bearing within the range of 350° to 375° F for a period of between one to three hours, the pressure applied to said bearing liner by the deforming of one of said members being in the range of approximately 400 p.s.i.

It is yet a further object of the present invention to provide a method of manufacturing a bearing wherein the method includes the additional step of loosening the inner member with respect to the outer member.

It is a further object of the present invention to provide a method of manufacturing a bearing utilizing a simplistic process apparatus highly adaptable to automated high volume manufacturing techniques.

It is still a further object of the present invention to provide a method of manufacturing a bearing wherein the manufactured bearing has superior performance characteristics yet it is relatively inexpensive.

DESCRIPTION OF THE INVENTION

Figure 1:
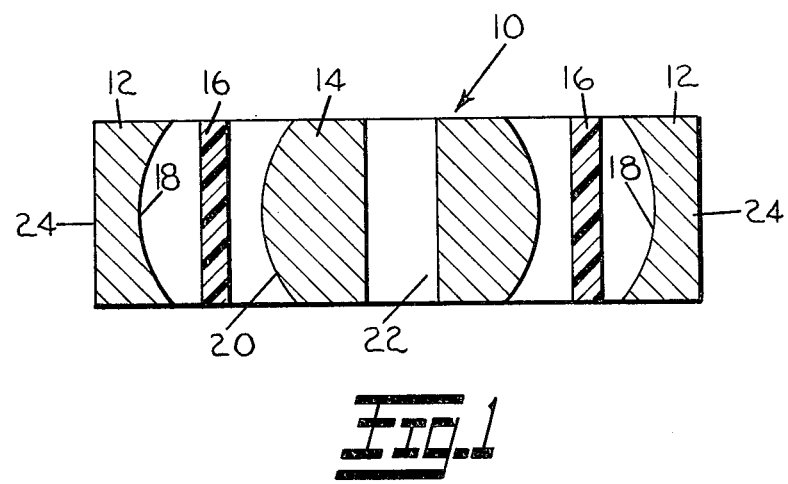
FIG. 1 shows one type of bearing in sectional form produced by the present method prior to assembly.

Referring now to the drawings and, in particular, FIG. 1, there is shown a typical spherical type bearing 10 in its unassembled state. The spherical bearing 10 comprises generally three parts, including an outer bearing member 12, an inner bearing member 14 and liner 16. The outer bearing member 12 is further provided with a concave inner surface 18. Similarly, the inner bearing member 14 is provided with a convex outer surface 20, said convex outer surface 20 being generally complementary to the concave inner surface 18 of the outer bearing member 12.

The inner bearing member 14 is additionally provided with a central bore 22 through which typically a bolt (not shown) is placed therethrough for operationally attaching the inner bearing member 14 to an associated machine, element, apparatus, or the like (not shown).

The outer bearing member 12 is typically provided with an outer cylindrical surface 24 which generally provides the assembling surface to which the outer bearing member 12 is attached to its associated machine, element, apparatus, or the like (not shown).

To enhance the bearing characteristics of the bearing 10, a liner 16 is provided between the inner and outer bearing members 12 and 14, respectively, and is typically bonded or otherwise suitably attached to the concave inner surface 18 of the outer bearing member 12. It is generally within the area of assembling and, more particularly, to bonding the liner 16 to the outer bearing member that the present invention is directed. More specifically, as mentioned above, the prior art forms of bearing manufacturing methods and those particularly relating to spherical bearings, typically pre-prepared the bearing liner before it was assembled within the bearing. This typically has caused problems both in terms of quality control and in cost. The present invention contemplates only certain pre-preparation stages of the liner, the final preparation taking place after the bearing is assembled.

The bearing liner 16 includes typically a Nomex cloth as its basic foundation element. In a typical application, the Nomex cloth which may be purchased from Stern & Stern Textiles Incorporated may be approximately 0.015 inches thick. The Nomex cloth, as designated by Stern & Stern Textiles Incorporated as their No. HT-315-55A Nomex cloth, typically has a thread count per inch of 49 (warp) and 42 (fill). The tensile strength of the warp thread is 129 pounds while the tensile strength of the fill threads is 121 pounds. The cloth which, as before mentioned, serves as the foundation to the liner 16 is coated on both its sides with a suitable resin material which will serve several purposes which will be explained in further detail below. The resin used may include a resin manufactured by H. B. Fuller, of St. Paul, Minnesota, designated as their Resiweld R7119. The resin may be applied by painting, spraying or other suitable application method. The resin will typically be the same on both sides of the Nomex cloth, however, one side, that side which will form the bearing surface, will typically further include a random dispersion of a self-lubricating material such as polytetrafluoroethylene particles. The ratio mixture of resin to such self-lubricating particles will be in the range of approximately 50—50, that is, 50 percent being resin and 50 percent being self-lubricating particles. These particles may be in the form of Teflon (a trademark of E. I. du Pont de Nemours Corporation) and, more specifically, may be in a powdered or flocked form, the latter being a fiber of approximately 1/64th of an inch long. The powdered or flocked Teflon may or may not be etched, depending upon the application to which the bearing is to be placed. As mentioned in my previous inventions which are noted above, etching of the Teflon particles enhances their bondability to the resin in which they are mixed. After coating of the Nomex cloth with the resin, the cloth may be allowed to air dry which is typically referred to in the art as "B" staging the material. This may be characterized as allowing the resin to dry to a hard, nontacky state but the resin remains in an uncured state.

A parting compound is applied to the bearing member to which the bearing liner 16 is not to be bonded. As is known, a parting compound inhibits and prevents a resin from bonding to the surface to which the parting compound is applied. A suitable parting compound is as manufactured by the Sprayon Products Company of Bedford Heights, Ohio and designated as their Spray Lube No. 708. The parting compound may be furnished in an aerosol type can with suitable propellant or may be sprayed on using conventional spraying apparatus. Generally, the parting compound is a dry lubricant of the Teflon variety.

Figure 2:
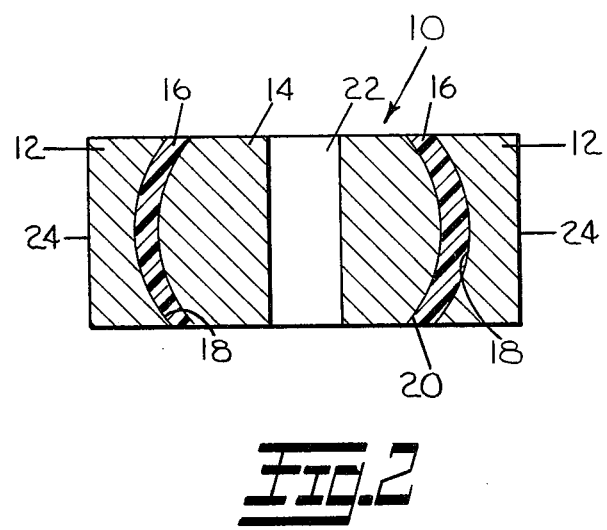
FIG. 2 shows the bearing, also in sectional form, of FIG. 1 in its assembled state.

The parting compound is typically applied by the above noted spraying or painting to the convex outer surface 20 of the inner member 14. Thereafter, the "B" staged liner is positioned between the outer bearing member 12 and the inner bearing member 14 as shown in FIG. 1. The outer bearing member and/or the inner bearing member 14 are suitably deformed to bring the various bearing parts into an interference fit relationship. The degree of interfit may be indicated by the degree of compression of the bearing liner 16 which, as before mentioned, is provided with a thickness of approximately 0.015 inch. In the assembled state, as shown in FIG. 2 the bearing liner would be compressed such that it would have a radial thickness of approximately 0.0125 inch which corresponds to approximately 400 p.s.i. pressure being exerted on the liner 16.

Typically, the outer bearing member 12 is contracted and compressed about the inner bearing member 14 by use of a suitable tool such as a tapered die (not shown). Alternatively, the inner member 14 could be expanded within the outer bearing member 12. An example of such expansion or contraction techniques are as shown in U.S. Pat. No. 3,369,285 to L. R. Heim, patented Feb. 20, 1968. Additionally, within the context of the present invention, either or both the inner bearing member 14 and outer bearing member 12 may be deformed to form an assembled bearing as shown in FIG. 2.

The assembled bearing with its respective parts in an interference fit relationship is then placed in a suitable oven or heating apparatus to bake the bearings and, more particularly, the liner disposed therein to cure the resin applied to the Nomex cloth. Typically, the temperature would be elevated in the oven or heating apparatus to a level of approximately 350° to 375° F and this level of heat would be maintained for a period of from one to three hours. After this heating period has been completed, the resin applied to the Nomex cloth will be cured and will form the bond between the liner and the concave inner surface 18. The parting compound which was applied to the convex outer surface 20 of the inner bearing member 14 will prevent the resin from bonding to said surface 20 thereby allowing the inner bearing member 14 to be rotatably supported within the bearing liner 16. The resin in its cured state will also perform the function of locking in place the self-lubricating particles or fibers which will enhance the bearing characteristics of the bearing liner 16.

Some small degree of shrinkage of the liner 16 may be encountered during the baking or heating of the bearing which will tend to reduce the interference fit between the inner bearing member 14 and the liner 16. The desired bearing tolerance between the inner bearing member 14 and the liner 16 can be achieved by "loosening" the said inner member 14 with respect to the liner 16. Such loosening might include the axial displacement of the inner member 14 with respect to the liner 16 and the outer bearing member 12. This would be accomplished by holding one of said members stationary and moving the other axially. Other suitable means of loosening can be used to achieve the proper bearing tolerance.

The important departure from the prior art is the provision of the parting compound on one of the surfaces defined by the outer bearing member or the inner bearing member, as, for example, the convex outer surface 20 of the inner bearing member 14. This unique utilization of the parting compound results in a bearing having superior bearing characteristics, while at the same time being of lower cost. Further, it has been determined that the Nomex cloth more closely conforms to the convex outer surface 20 of the inner bearing member 14 and the concave inner surface of the outer bearing member 12 to provide a uniform backing to the bearing surface defined by the resin containing the self-lubricating particles or material.

It is to be understood that the above described method and arrangements are only illustrative of the application of the principles of the present invention. Numerous other methods and arrangements may be devised by those skilled in the art without departing from the spirit and/or scope of the present invention. For example, a parting compound may be coated or applied to the concave inner surface 18 of the outer member 12 such that the liner 16 is bonded to the convex outer surface 20 and the liner 16 being carried thereby. Further, the present invention may be applied to spherical bearings which are assembled without deforming one or both of their respective parts such as shown in my U.S. Pat. No. 3,365,249 patented Jan. 23, 1968.

What is claimed is:

1. A method of manufacturing a bearing comprising the steps of forming an outer bearing member with an inner bearing surface and an inner bearing member with an outer bearing surface, forming a bearing liner including uncured adhesive resin applied to each side of a liner material, coating the bearing surface of one of the bearing members with a parting compound, placing the uncured liner in a position between bearing surfaces of said outer and inner members, assembling said bearing, applying curing heat to the assembled bearing, curing said resin material and thereby bonding the liner to said bearing member to which the parting compound was not applied, the parting compound inhibiting a bond between the liner and said bearing member to which said parting compound was applied.

2. A method of manufacturing a bearing in accordance with claim 1 wherein said outer bearing member is provided with a concave inner bearing surface and said inner bearing member is provided with a complementary convex outer bearing surface, and wherein the coating step comprises coating the parting compound to the convex outer surface of said inner bearing member.

3. A method of manufacturing a bearing in accordance with claim 1 wherein a random dispersion of self-lubricating particles is included within the resin applied to the side of said liner confronting the bearing member to which the parting compound was applied.

4. A method of manufacturing a bearing in accordance with claim 3 wherein said self-lubricating particles include a random dispersion of polytetrafluoroethylene particles.

5. A method of manufacturing a bearing in accordance with claim 3 wherein said self-lubricating particles include a random dispersion of flocked polytetrafluoroethylene fibers.

6. A method of manufacturing a bearing in accordance with claim 1 wherein said liner includes a Nomex cloth.

7. A method of manufacturing a bearing in accordance with claim 1 wherein said uncured resin applied to each side of said liner is air dried before placing said liner in a telescoped position between said outer and inner members.

8. A method of manufacturing a bearing in accordance with claim 1 wherein heat is applied to the assembled bearing within the range of 350° to 375° F for a period of between one to three hours, the pressure applied to said bearing liner by the deforming of one of said members being in the range of approximately 400 p.s.i.

9. A method of manufacturing a bearing in accordance with claim 1 wherein the method includes the additional step of loosening the inner member with respect to the outer member, said loosening comprising the step of axially displacing one of the bearing members with respect to the other bearing member.

10. A method of manufacturing a bearing in accordance with claim 1 wherein said bearing is assembled by deformably contracting one of said members.

11. A method of manufacturing a bearing in accordance with claim 10 wherein said outer member is deformably contracted about the inner member.

12. A method of manufacturing a bearing in accordance with claim 1 wherein said bearing is assembled by deformably expanding one of said members.

* * * * *